No. 794,725. PATENTED JULY 18, 1905.
E. MARI.
VEHICLE WHEEL.
APPLICATION FILED APR. 5, 1905.
2 SHEETS—SHEET 1.
Fig I
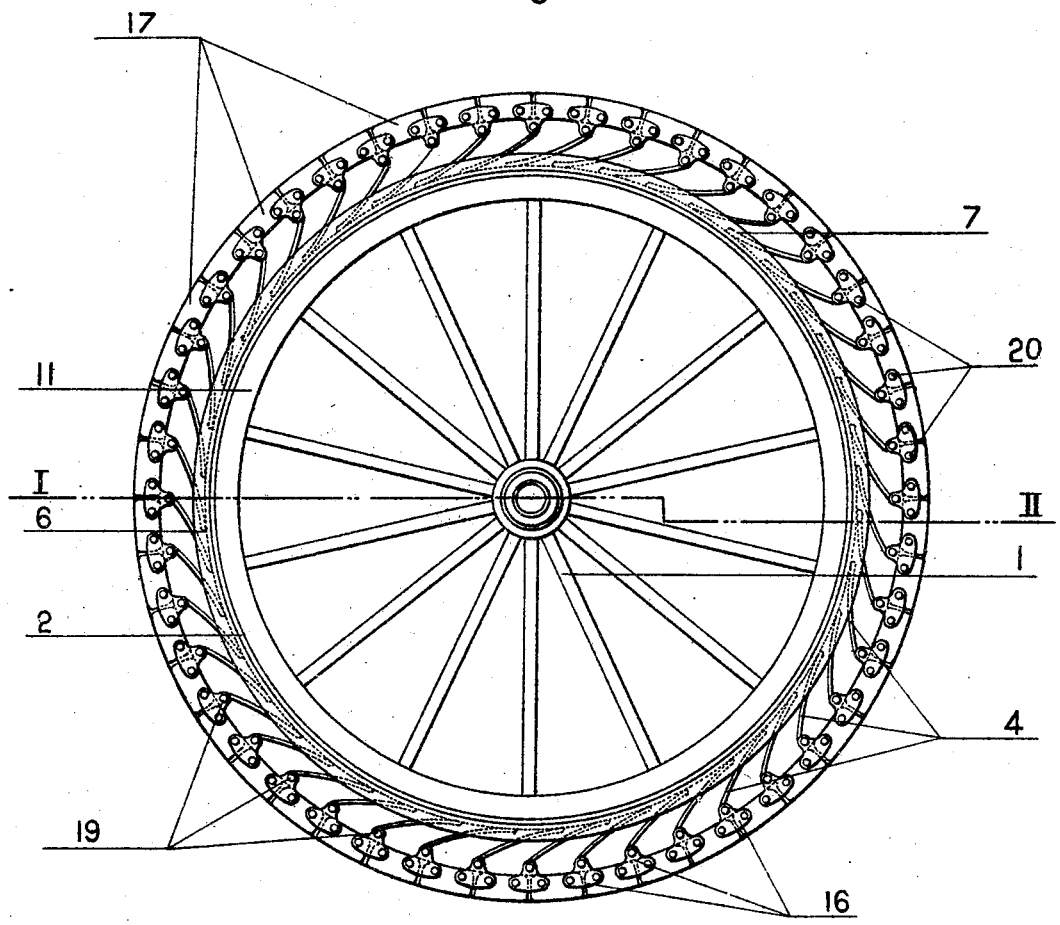
Fig II
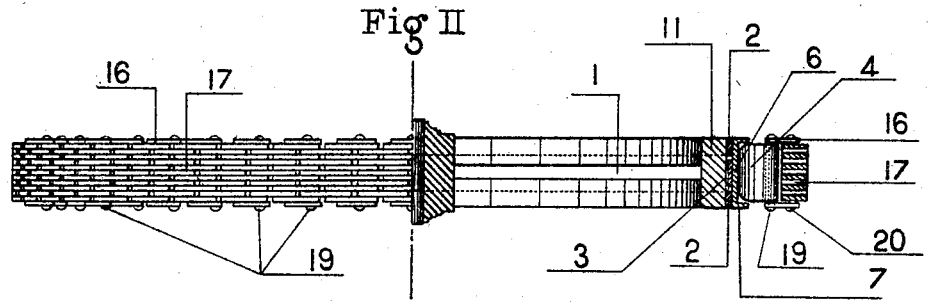
WITNESSES
George G. Schoenlank
INVENTOR,
ERNESTO MARI,
BY H. van Oldenneel
HIS ATTORNEY.

No. 794,725. PATENTED JULY 18, 1905.
E. MARI.
VEHICLE WHEEL.
APPLICATION FILED APR. 5, 1905.
2 SHEETS—SHEET 2.
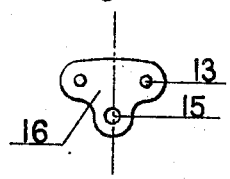
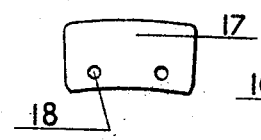
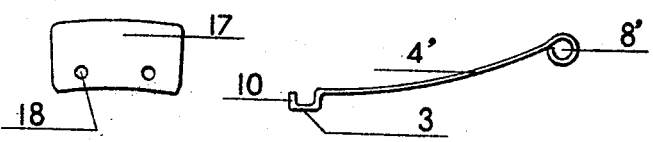
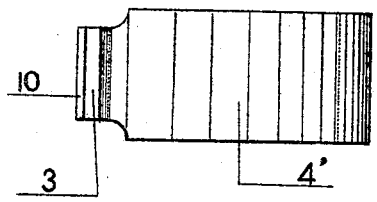
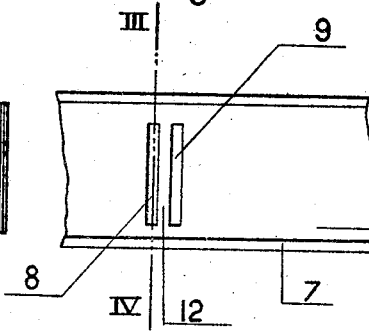
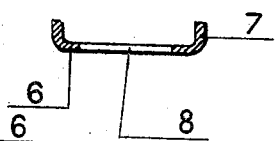
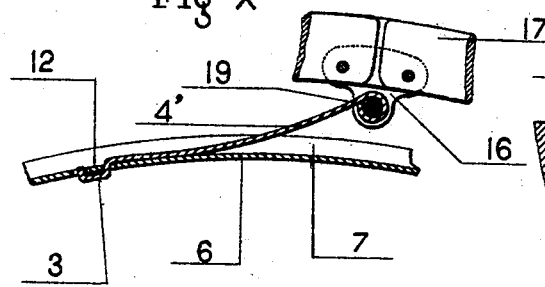
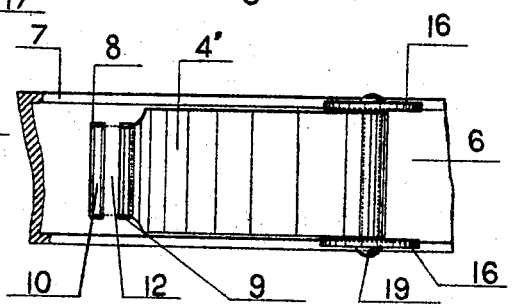
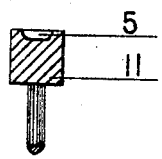
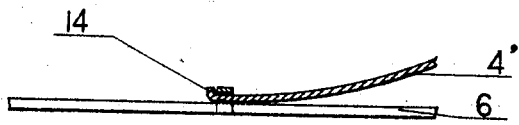
WITNESSES;
George G. Schvenlank
INVENTOR,
ERNESTO MARI,
BY H. van Oldenneel
HIS ATTORNEY.

No. 794,725.

Patented July 18, 1905.

UNITED STATES PATENT OFFICE.

ERNESTO MARI, OF BUENOS AYRES, ARGENTINA.

VEHICLE-WHEEL.

SPECIFICATION forming part of Letters Patent No. 794,725, dated July 18, 1905.

Application filed April 5, 1905. Serial No. 253,914.

*To all whom it may concern:*

Be it known that I, ERNESTO MARI, a subject of the King of Italy, residing at the city of Buenos Ayres, Argentina, have invented new and useful Improvements in Vehicle-Wheels, of which the following is a specification.

This new invention relates to wheels for vehicles, including automobiles, wagons, &c.; and the objects thereof are, first, to provide wheels with resilient or elastic tires which may be employed in place of or in addition to pneumatic or cushion tires, and, second, to simplify the construction, while increasing the durability and efficiency of such wheels.

As shown in the accompanying drawings and hereinafter described, the tire is preferably composed of a great number of sections arranged concentrically to the wheel and all flexibly or articulately connected together and the tire being connected by flat-strip springs to the wheel at intervals.

For a clearer understanding of my invention I refer to the accompanying drawings, in which—

Figure I represents a complete wheel constructed according to my improvements. Fig. II is a plan view of such wheel partially cut away on line 1 2 of Fig. I. Fig. III illustrates one of the plates connecting the wheel-tire proper. Fig. IV is a sectional view thereof on the dotted line of Fig. III. Fig. V is a view of one of the pieces from which the wheel-tire sections are made up. Figs. VI and VII respectively represent a side and a plan view of one of the springs. Fig. VIII is a plan view of a portion of wheel rim or band provided with apertures for engaging one end of a spring. Fig. IX is a section on line III IV of Fig. VIII. Fig. X is a fragmentary section showing the connections of spring, band, and tire. Fig. XI is a plan view of the same parts without the tire. Fig. XII shows in section a spoke and a portion of a wheel-felly having a peripheral groove permitting the use of my invention without a band or rim, and Fig. XIII is a sectional view (fragmentary) illustrating a modification of connection between spring and wheel.

Like numerals of reference indicate similar parts in the different figures of the drawings.

In order to carry out my invention, I provide a wheel having a felly, hub, and spokes 1 of any type and material and on the felly of which I place two metal bands or hoops 2, which are preferably put on heated, so that when cold they will contract and firmly grip the wheel-felly. The bands or hoops 2 are narrower than the felly and leave between them a free annular space for receiving the ends 3 of the springs, as hereinafter described. If desired, the bands or hoops 2 can be omitted and an annular peripheral groove 5, Fig. XII, be directly cut into the body of the felly and receive the ends 3 of the aforesaid springs 4. If desired, however, I may employ the connection shown in Fig. XIII, which I shall describe hereinafter. Upon or between these hoops or bands 2 or directly on the wheel-felly, as the case may be, is placed a metallic band or hoop 6, continuous or sectional and preferably of the same width as the wheel itself, (although it may be wider or narrower, if desired.) This band or rim 6 is preferably put on heated, so that when cold it will contract and will firmly grip the hoops 2 or directly grip the wheel, as the case may be, or the band may be secured in any other suitable manner. The band 6 is provided with two flanges 7, which are useful for housing the springs 4 and preventing their being displaced. Said springs are securely fastened to the band or rim 6 and in Figs. II and X and XI by means of channeled ends 3, which pass through and engage two similar apertures 8 and 9, both of them corresponding in position to the bends in the springs, and said pair of apertures being repeated at intervals in the entire circumference of the band or rim 6. These springs are formed of flat plates 4, bent slightly upward and having their outer ends bent or rolled to form eyes 8,' which engage bolts 19, as shown in Figs. I, X, and XI. The opposite end of each spring is somewhat narrower and terminates in a double-bent or U-shaped portion 3, the extreme end 10 of which is passed through the opening 9 in band 6, and then the spring is turned slightly, so that the end 10 passes next through the other aperture 8. This securely fixes the spring in place, the bottom 3 resting, as shown in Fig. II, directly on the felly, and the end of the spring closely engages the apertures 8 and 9, which thus impede its lateral movement, assisted by flanges 7. The cross-bar 12 between the openings 8 and 9 also grips the end of the spring and prevents all tangential oscillation or movement.

A modification of the means for connecting the spring to the band or rim 6 is shown in Fig. XIII, wherein the gripping-bar 12 is added to the rim 6 (not cut therein, as before described) in any suitable manner. As shown in said Fig. XIII, it is not absolutely necessary to provide the end of the spring 4' with more than a single bent portion 14.

In assembling the parts of the wheel according to my invention I may proceed as follows: On a wheel of any kind, preferably one having a flat felly, are put, if desired, the bands or bent metallic parts 2 in any known manner. On these or on the wheel-felly itself, as the case may be, is secured in any suitable way the band or rim 6. Next the U-shaped ends of the springs are engaged in the above-described manner. Bolts 19 are now passed through openings 15 in connecting-plates 16 (see Fig. III) and through the eyes 8' in the free ends of the springs. The connecting-plates 16 are arranged, as shown in Fig. II, at the outer edges of the tire, and each bolt 19 passes through two of said plates. The tire is therefore composed in part of the various plates 16, the remainder of the tire being made up of a great number of short plates 17, (see Fig. V,) which are connected as in ordinary belt construction to make a complete tire, as illustrated in Figs. I and II.

The materials employed may be of any suitable kind, those of the tire-sections 17 being preferably leather, papier-mâché or vegetable fibers, while the connecting-plates 16 will preferably be of metal.

In the above description I have spoken of flat-rim wheels only; but my invention can also be applied to wheels having hollow rims of the kind used for pneumatic tires, in which case the band or rim 6 can be secured to the felly by means of bolts piercing it or by placing in the grooved felly or rim thereon another band, on which band or rim 6 is secured in any manner. In fact, the band or rim 6 can be secured to any class of wheel. This done the remaining parts may be as above described.

What I claim is—

1. In combination, a wheel, a tire composed of successive sections concentrically arranged around the wheel, each section being made up of a plurality of plates, and the several sections being connected together, and yielding connections between said tire and wheel.

2. In combination, a wheel, a tire composed of successive sections concentrically arranged around the wheel, each section being composed of a plurality of plates, and the successive sections being flexibly connected, and yielding connections between each of the sections and the wheel.

3. In combination, a wheel, a curved metallic plate secured to said wheel, a tire composed of successive sections concentrically arranged around the wheel, and springs consisting of flat strips connecting the tire and the metallic band at intervals.

4. In combination, a wheel, a curved plate secured to said wheel, a tire composed of successive sections concentrically arranged around said wheel, and springs consisting of flat metallic strips connecting the tire and the metallic band at intervals, and having a locking connection with one of said parts and a loose connection with the other.

5. In combination, a wheel, a curved plate secured to said wheel and provided with gripping parts at intervals, a tire composed of successive sections concentrically arranged around said wheel, and springs consisting of flat strips connecting the several sections of the tire with the curved plate and having a locking engagement with the gripping parts aforesaid.

6. In combination, a wheel, a curved band, having outwardly-extending flanges, fitted to the rim of the wheel, a tire composed of successive sections concentrically arranged around said wheel, and springs, consisting of flat metallic strips housed between the said wheel-flange, and having a gripping engagement with the band at intervals and having a loose engagement with the tire-sections.

7. In combination, a wheel, a curved band fitted to the rim of the wheel, and having a plurality of gripping means, a tire concentrically arranged around said wheel and provided with a plurality of pins, and springs, between the tire and band, said springs consisting of flat metallic strips provided with loops for engaging the tire-pins and with parts for rigidly engaging the gripping means on the band.

In testimony whereof I have signed my name to this specification in the presence of two subscribing witnesses.

ERNESTO MARI.

Witnesses:
I. E. Ueller,
Do. Filippini.